Patented May 8, 1923.

1,454,205

UNITED STATES PATENT OFFICE.

ALOIS ZINKE, OF GRAZ, AUSTRIA.

PROCESS OF MANUFACTURING DIOXYPERYLENE.

No Drawing. Original application filed February 24, 1921, Serial No. 447,561. Divided and this application filed June 14, 1922. Serial No. 568,289.

*To all whom it may concern:*

Be it known that I, ALOIS ZINKE, citizen of the Republic of Austria, residing at Graz, Styria, Republic of Austria, have invented certain new and useful Improvements in a Process of Manufacturing Dioxyperylene, of which the following is a specification.

My invention has for its object to manufacture a new compound heretofore unknown which I call dioxyperylene and which I believe to be the hydrocarbon perylene ($C_{20}H_{12}$) in which two H atoms are substituted by the OH group.

This application is a division of my application of February 24th, 1921, Serial No. 447561.

With this object in view, I first mix alkylated dioxybinaphthyl with condensing agents and then heat the mixture to a temperature below the melting temperature of dioxyperylene, whereby the dioxyperylene is formed, which is separated from the mass by lixiviation and is then purified.

This new perylene derivative which thus forms a new article of manufacture is a yellow or yellowish green substance not crystalline and having a high melting temperature (above 150° centigrade), it is readily soluble in caustic alkali, glacial acetic acid, benzol and toluol, the solutions showing an intense green fluorescence, it is little soluble in alcohol and not at all soluble in water.

The following is an example of carrying into practice my present invention:

1 part by weight of 2, 2′ dimethoxy—1, 1′ binaphthyl is intimately mixed with 4 parts by weight of aluminium chloride serving as a condensing agent in a finely powdered state and the mixture is heated under exclusion of water in any form for about two hours at atmospheric pressure to a temperature below the melting temperature of dioxyperylene, preferably to a temperature of 140 to 150 degrees centigrade, whereby dioxyperylene is formed, the reaction being almost quantitative. For removing from the mass thus obtained the condensing agent and its products of decomposition this mass is lixiviated with a suitable solvent, in the above example with dilute hydrochloric acid and the solid residue consisting in the main of dioxyperylene is separated from the liquid adhering thereto by filtration, preferably with the use of vacuum.

For purifying the dioxyperylene thus obtained it may be dissolved in a caustic alkali or in glacial acetic acid and then precipitated by the addition of water. If dissolved in caustic alkali the dioxyperylene is liable to be converted into the corresponding quinone which differs from dioxyperylene by the fact that its solutions do not show any fluorescence. If on precipitating the dioxyperylene from its solution in a caustic alkali the quinone were found to have formed in a considerable quantity, it may be reconverted into dioxyperylene by treating the same under slight heating as in a water bath with sodic lye and sodium hydrosulphite.

Instead of dimethoxybinaphthyl other alkyl derivatives of the binaphthol may be used.

I claim:

1. A process for treating alkyl derivatives of dioxybinaphthyls, consisting in mixing the same with a condensing agent, heating the mixture to a temperature lower than the melting temperature of dioxyperylene, under exclusion of water in any form, lixiviating the mass obtained with a solvent for the condensing agent and its products of decomposition and separating the solid residue thus obtained from the liquid, whereby dioxyperylene is obtained.

2. A process for treating alkyl derivatives of dioxybinaphthyls, consisting in mixing the same with aluminium chloride, heating the mixture to a temperature lower than the melting temperature of dioxyperylene under exclusion of water in any form and lixiviating the mass obtained with dilute hydrochloric acid whereby aluminium chloride and its products of decomposition are dissolved separating the solid residue from the liquid whereby dioxyperylene is obtained.

3. A process for treating alkyl derivatives of dioxybinaphthyls, consisting in mixing the same with a condensing agent heating the mixture to a temperature lower than the melting temperature of dioxyperylene under the exclusion of water in any form, lixiviating the mass obtained with a solvent for the condensing agent and its products of decomposition separating the solid residue thus obtained from the liquid, dissolving the solid residue in a solvent and precipitating it again by the addition of water to the solution, whereby purified dioxyperylene is obtained.

4. A process for treating alkyl derivatives of dioxybinaphthyls consisting in mixing the same with a condensing agent heating the mixture to a temperature lower than the melting temperature of dioxyperylene under exclusion of water in any form, lixiviating the mass obtained with a solvent for the condensing agent and its products of decomposition, separating the solid residue, thus obtained from the liquid, dissolving the solid residue in caustic alkali, and precipitating it again by the addition of water to the solution whereby purified dioxyperylene is obtained.

5. A process for treating alkyl derivatives of dioxybinaphthyls consisting in mixing the same with a condensing agent, heating the mixture to a temperature lower than the melting temperature of dioxyperylene under exclusion of water in any form, lixiviating the mass obtained with a solvent for the condensing agent and its products of decomposition, separating the solid residue from the liquid, dissolving such residue in caustic alkali and precipitating it by the addition of water to the solution, treating the precipitate with sodic lye and sodium hydrosulphite, whereby any perylene quinone formed by first dissolving the residue in caustic alkali is reconverted into dioxyperylene.

6. As a new product of manufacture a perylene derivative in which for two of the atoms of hydrogen in the perylene molecule the OH group is substituted.

In testimony whereof I affix my signature in presence of two witnesses.

Dr. ALOIS ZINKE.

Witnesses:
  Carl Condenberg,
  Arthur Baumann.